United States Patent
Crowley

(10) Patent No.: US 10,517,285 B2
(45) Date of Patent: Dec. 31, 2019

(54) VEHICLE WITH CHASSIS HEIGHT ADJUSTMENT

(71) Applicant: AGCO Corporation, Duluth, GA (US)

(72) Inventor: Mark Aron Crowley, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 161 days.

(21) Appl. No.: 15/842,438

(22) Filed: Dec. 14, 2017

(65) Prior Publication Data
US 2018/0177177 A1    Jun. 28, 2018

Related U.S. Application Data

(60) Provisional application No. 62/437,805, filed on Dec. 22, 2016.

(51) Int. Cl.
| | |
|---|---|
| *B60G 3/02* | (2006.01) |
| *A01M 7/00* | (2006.01) |
| *A01B 63/10* | (2006.01) |
| *B60G 3/01* | (2006.01) |
| *B62D 49/06* | (2006.01) |

(52) U.S. Cl.
CPC ....... *A01M 7/0057* (2013.01); *A01B 63/1006* (2013.01); *A01M 7/0082* (2013.01); *B60G 3/01* (2013.01); *B60G 3/02* (2013.01); *B60G 2204/423* (2013.01); *B60G 2300/08* (2013.01); *B60G 2300/083* (2013.01); *B62D 49/0607* (2013.01)

(58) Field of Classification Search
CPC ........ B60G 17/00; B60G 17/015; B60G 3/01; B60G 11/27; B60G 2200/44; B60G 2300/08
See application file for complete search history.

(56) References Cited

U.S. PATENT DOCUMENTS

| | | | | |
|---|---|---|---|---|
| 5,597,172 A | * | 1/1997 | Maiwald | B60G 3/00 280/124.153 |
| 6,491,306 B2 | * | 12/2002 | Schaffer | B60G 3/01 280/5.502 |
| 7,168,717 B2 | * | 1/2007 | Wubben | B60B 35/001 280/124.127 |
| 7,837,207 B2 | * | 11/2010 | Kremmin | B60G 3/01 180/900 |
| 8,042,817 B2 | * | 10/2011 | Motebennur | B60G 9/00 280/5.514 |

(Continued)

*Primary Examiner* — Faye M Fleming

(57) ABSTRACT

A suspension module includes a spindle pivotably connected to an axle with a pivot element defining a vertical axis. The spindle has an attachment member and an attachment cap, with outer ends are rigidly interconnected by a pair of lift cylinders. The spindle includes a plate extending between the lift cylinders intermediate the attachment member and cap with the pivot element received between the attachment member and plate. Each lift cylinder has a ram movable within a housing of the lift cylinder. A wheelbox mounts to the wheel and couples with the spindle. First and second strut rods connect the wheelbox with the ram of one of the lift cylinders, and third and fourth strut rods connect the wheelbox with the ram of a second lift cylinder. The strut rods allow the spindle to move relative to the wheelbox while also transferring pivot torque between the wheelbox and the spindle.

7 Claims, 6 Drawing Sheets

(56) References Cited

U.S. PATENT DOCUMENTS

| | | | | |
|---|---|---|---|---|
| 8,424,881 | B2* | 4/2013 | Vander Zaag | A01B 63/22 |
| | | | | 280/43.17 |
| 9,079,470 | B2* | 7/2015 | Slawson | B62D 49/0607 |
| 9,180,747 | B2* | 11/2015 | Slawson | B60G 3/01 |
| 9,259,986 | B2* | 2/2016 | Slawson | B60G 3/01 |
| 9,278,594 | B2* | 3/2016 | Horsch | B60G 3/01 |
| 9,290,074 | B2* | 3/2016 | Slawson | B60G 17/005 |
| 9,296,273 | B2* | 3/2016 | Slawson | B60G 17/005 |
| 9,636,960 | B2* | 5/2017 | Vidal | B60G 3/01 |
| 9,931,901 | B2* | 4/2018 | Slawson | B60G 17/005 |
| 2011/0024219 | A1* | 2/2011 | Jorgensen | B60G 3/01 |
| | | | | 180/252 |
| 2011/0049263 | A1* | 3/2011 | Vander Zaag | A01B 63/22 |
| | | | | 239/172 |
| 2012/0241230 | A1* | 9/2012 | Vidal | B60G 3/01 |
| | | | | 180/58 |
| 2013/0069336 | A1* | 3/2013 | Horsch | B60G 3/01 |
| | | | | 280/124.154 |
| 2017/0355243 | A1* | 12/2017 | Albert | B60K 7/0015 |
| 2018/0250997 | A1* | 9/2018 | Slawson | B60G 3/01 |

* cited by examiner

VEHICLE WITH CHASSIS HEIGHT ADJUSTMENT

CROSS REFERENCE TO RELATED APPLICATION

This application claims the benefit of U.S. Provisional Application No. 62/437,805 filed Dec. 22, 2016, which is hereby incorporated by reference in its entirety.

BACKGROUND OF THE INVENTION

Field of Invention

Embodiments of the present invention relate to mobile machines, such as self-propelled agricultural machines and similar vehicles. More particularly, embodiments of the present invention relate to a mobile machine with an adjustable-height chassis.

Description of Related Art

Some agricultural vehicles are configured to be operated in fields among row crops. Application machines such as self-propelled sprayers, for example, may have wheels configured to pass between crop rows and a spray boom that extends outwardly from the vehicle to spray the crop as the machine travels through the field. In order to avoid damaging the crops as the vehicle moves through the field, the vehicle should have sufficient ground clearance (the distance between the vehicle body and the surface over which it moves) to clear the crops.

While a standard height agricultural vehicle may be used to process short crops, such as early stage corn or the like, difficulties arise when processing taller crops, such as mature corn, that are taller than the ground clearance of a standard vehicle. For such crops, high clearance vehicles may be used. While high clearance vehicles provide sufficient clearance to pass over the top of taller crops, they suffer from various limitations. For example, high clearance vehicles, such as those that provide a crop clearance of seventy inches or more, may have an overall height that exceeds highway height restrictions, thereby making the transport of such vehicles to and from the field difficult. For example, public highways often restrict the height of a load to twelve feet or less which may be exceeded when a high clearance vehicle is placed on a transport trailer. Thus, measures may need to be taken to lower the vehicle to an acceptable transport height, such as deflating the tires or entirely removing the wheels.

In addition, while high clearance vehicles may be desirable for use on tall crops, they are not as effective in processing shorter crops without added complexity in the boom lifting mechanism to accommodate the range of motion required to place the boom at the proper height above the crop when spraying at the various crop heights. Some systems have been developed to increase the ground clearance of an existing vehicle. But these systems are complicated and require the removal of existing vehicle equipment and/or the addition of new equipment.

BRIEF SUMMARY OF THE INVENTION

Briefly stated, the invention is directed to a suspension module for supporting a vehicle chassis on a wheel of the vehicle. The suspension module includes a spindle pivotably connected to an axle on the vehicle chassis with a pivot element on the axle defining a substantially vertical pivot axis. The spindle has a lower attachment member and an upper attachment cap separated by a space, wherein outer ends of the lower attachment member and outer ends of upper cap are rigidly interconnected by a pair of lift cylinders. The spindle further includes a mid plate extending between the lift cylinders intermediate the lower attachment member and upper cap with the pivot element received between the lower attachment member and mid plate. Each lift cylinder has a ram movable within a housing of the lift cylinder. The suspension module also has a wheelbox mounted to the wheel and slidingly coupled with the spindle, wherein the spindle is configured to move between a standard operating position and a high clearance operating position relative to the wheelbox. The suspension module has first and second strut rods connecting the wheelbox with the ram of a first one of the pair of lift cylinders, and third and fourth strut rods connecting the wheelbox with the ram of a second one of the pair of lift cylinders. The strut rods are configured to extend from the respective lift cylinder to allow the spindle to move relative to the wheelbox while also transferring pivot torque between the wheelbox and the spindle. The suspension module also has a pneumatic circuit configured to move each of the rams within the respective housing of each of the lift cylinders to move the vehicle up or down between the high-clearance and low-clearance positions.

This summary is provided to introduce concepts in simplified form that are further described below in the Description of Preferred Embodiments. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Figure 1:
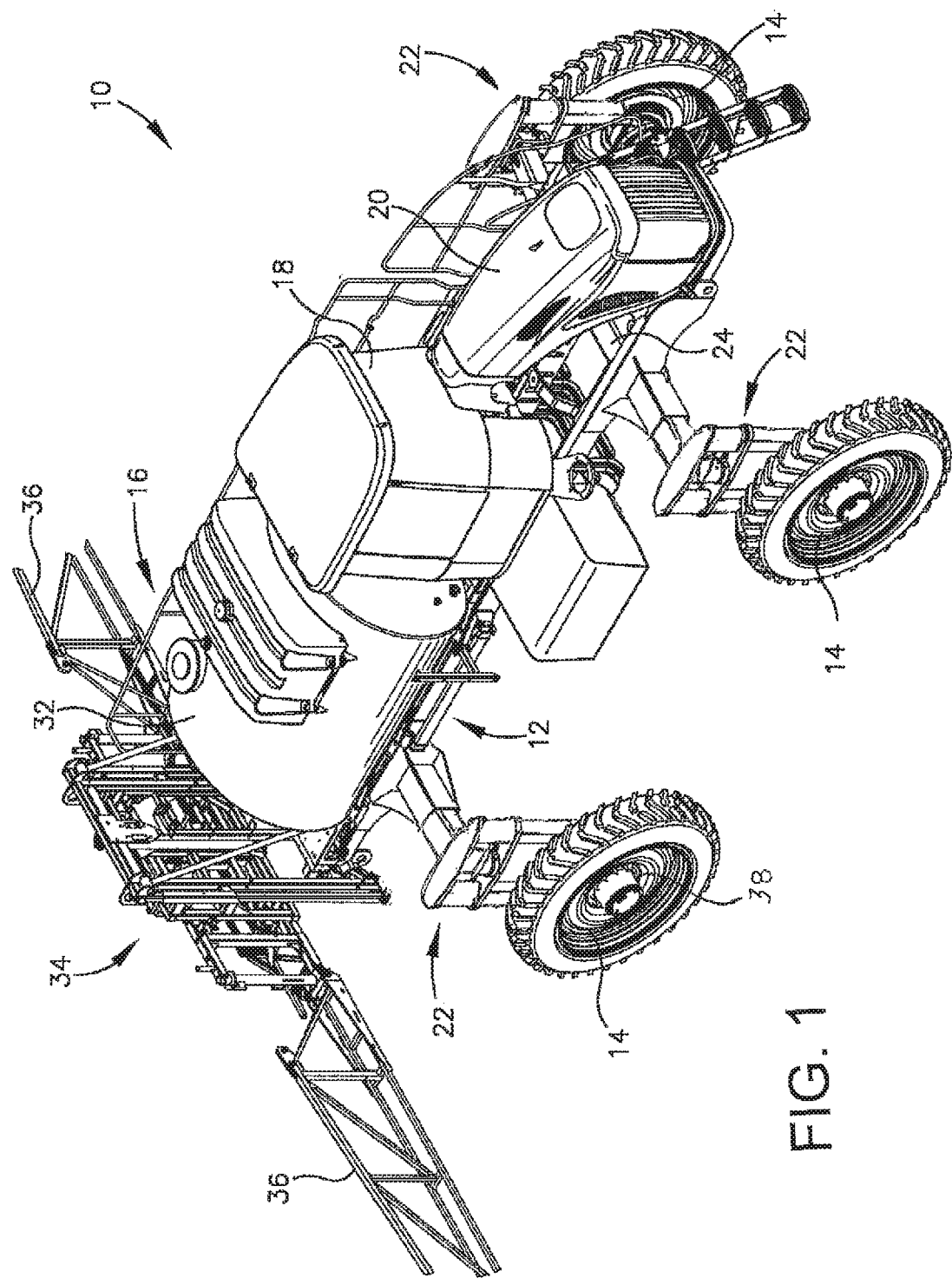
FIG. 1 is a perspective view of an agricultural applicator vehicle having suspension modules interposed between the wheels and the chassis in accordance with principles of the present invention.

The drawing figures do not limit the present invention to the specific embodiments disclosed and described herein.

The drawings are not necessarily to scale, emphasis instead being placed upon clearly illustrating the principles of the invention.

DETAILED DESCRIPTION OF EXEMPLARY EMBODIMENTS

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etcetera described in one embodiment may also be included in other embodiments, but is not necessarily included. Thus, the present technology can include a variety of combinations and/or integrations of the embodiments described herein.

The particular size and shape of the various components of the invention may vary substantially from one embodiment to another without departing from the spirit or scope of the invention. Therefore, while dimensions and proportions of various components are set forth herein, it will be understood that such information is provided by way of example and does not limit the scope of the invention as recited in the claims.

Turning now to the drawing figures, and initially to FIG. 1, an exemplary application vehicle 10 constructed in accordance with embodiments of the invention is illustrated. The application vehicle 10 broadly includes a chassis 12, a plurality of wheels 14 or other ground engaging elements supporting the chassis 12 above a ground surface, an application system 16, an operator cab 18, and an engine compartment 20. A plurality of suspension modules 22 interposed between the wheels 14 and the chassis 12 support the chassis 12 on the wheels 14 and provide suspension, height adjustment and/or steering functions, as discussed in greater detail below.

Certain components of the application vehicle 10 have been omitted from the figures for simplicity of illustration and to show certain features of the application vehicle 10 that would otherwise be concealed. The engine, for example, has been omitted to illustrate components of the applicator frame, including portions of the front axle 24. Certain pneumatic or hydraulic lines, such as pneumatic or hydraulic lines running to and from the suspension modules 22, are also omitted. The application vehicle 10 is illustrated and discussed herein as an exemplary machine with which the suspension modules 22 may be used. It will be appreciated by those skilled in the art that the suspension modules 22 may be used with other machines including other types of applicators or other vehicles or mobile machines that would benefit from the advantages of the various embodiments of the suspension modules disclosed herein, such as chassis height adjustment and independent suspension.

As is known in the art, one or more drive motors (not shown) may be associated with one or more of the wheels 14 for driving rotation of the wheel relative to the chassis 12 to thereby propel the application vehicle 10 in forward and reverse directions. Desirably, a separate hydraulic motor is drivingly connected to each wheel 14 such that each of the wheels 14 may be driven independently to propel the application vehicle 10. Either two or all four of the wheels 14 may be steerable. In some embodiments, the steering functionality of some of the wheels 14 may be selectively enabled and disabled. By way of example, the front wheels 14 may always be steerable while supplemental steering provided by the rear wheels 14 may be selectively enabled and disabled. An operator may control the drive motors and steering functions of the wheels 14, including enabling and disabling the steering ability of certain of the wheels 14, from one or more of the user interface elements of the cab 18.

Front and rear axles 24 are rigidly connected to the chassis 12. Desirably, the application vehicle 10 includes mechanisms for adjusting the track width of the wheels 14 to accommodate, for example, different spacing needs for row crops. In one embodiment, the application vehicle 10 includes telescoping axles 24 that allow the wheels 14 to shift laterally relative to the chassis 12 as described in commonly assigned U.S. Pat. No. 9,079,470 and as would be understood by one skilled in the art.

The application system 16 is supported on the chassis 12 and may be conventional in nature. In the illustrated embodiment, the application system 16 includes a liquid holding tank 32 and a delivery system 34 for applying a liquid from the holding tank 32 to a crop or field. The delivery system 34 includes a pair of booms 36 supporting hoses, pumps and spray nozzles or similar components for dispersing or otherwise applying the contents of the tank to a crop. Alternatively, the application system 16 may be configured to apply dry material to a field and therefore may include a hopper and a mechanism for dispersing particulate material from the hopper, such as a pneumatic spreader or one or more spinners.

The operator cab 18 is supported on the chassis 12 and positioned forward of the application system 16. The cab presents a control environment that enables the operator to control the functions of the application vehicle 10, including operating the application system 16.

As mentioned above, the application vehicle 10 includes a suspension module 22 interposed between each of the wheels 14 and the chassis 12. Each suspension module 22 connects a hub 38 of one of the wheels 14 to one of the axles 24 such that the wheel 14 and the suspension module 22 desirably shift laterally as a single unit relative to the chassis 12 when the axle 24 is shifted to adjust the applicator's track width. Additionally, one or more of the suspension modules 22 (or portions thereof) may be selectively pivotable relative to the chassis 12 to thereby steer the application vehicle 10. As will be more fully discussed below, the suspension modules 22 include height adjustment components for raising and lowering the chassis 12 of the vehicle between various operating positions. Each of the suspension modules 22 includes one or more actuators for adjusting a height of the chassis 12, for steering the associated wheel 14, or both. In some embodiments, the actuators are pneumatic actuators. Alternately, hydraulic actuators such as linear or rotary hydraulic actuators may also be used. It will be appreciated that various different types of conventional technology may be used to actuate the suspension modules 22. Thus, it will be understood that any known type of actuator may be used without departing from the spirit or scope of the invention.

Figure 2:
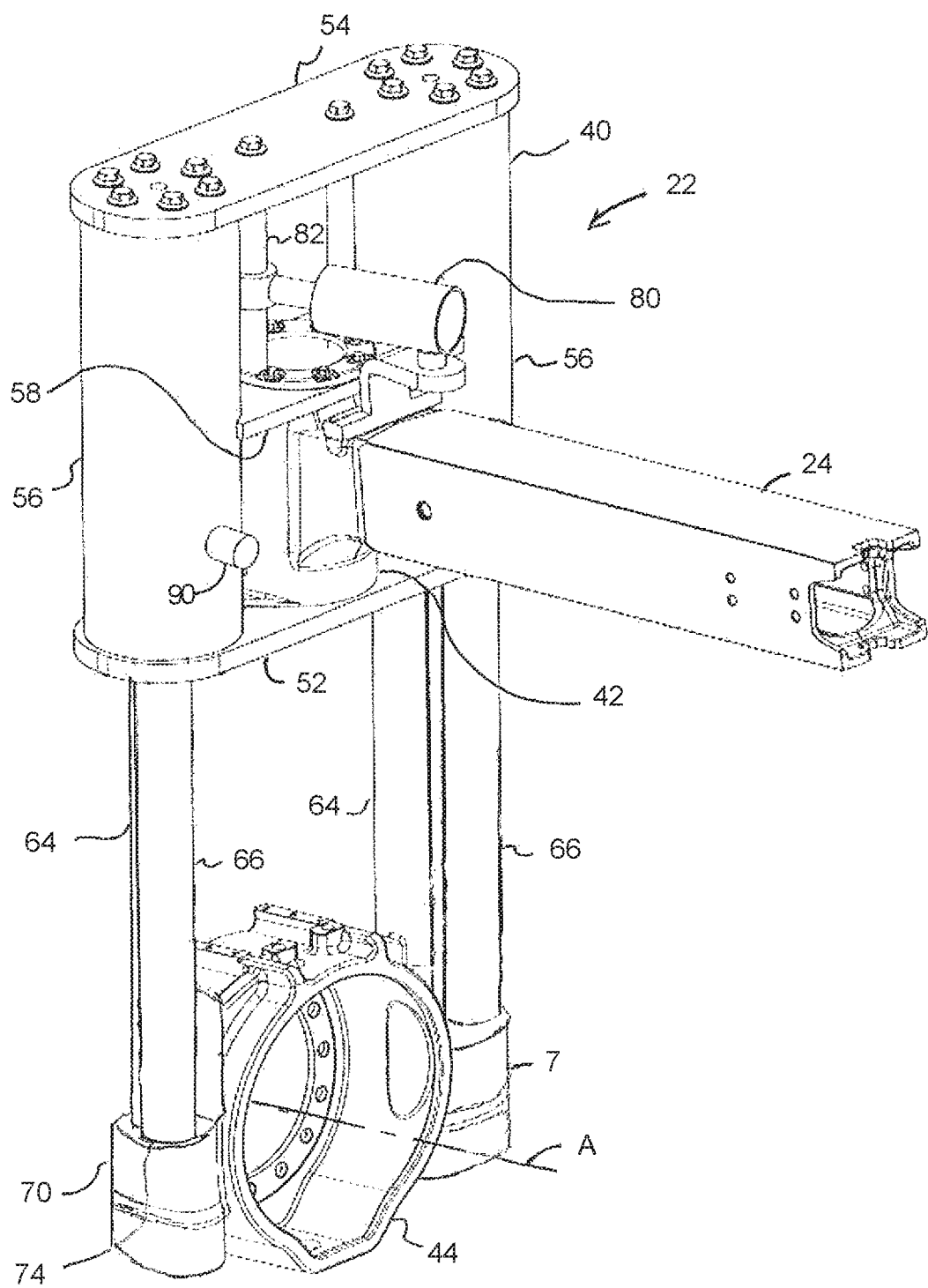
FIG. 2 illustrates an enlarged perspective view of one of the suspension modules of the vehicle of FIG. 1 in a first operating position.
Figure 3:
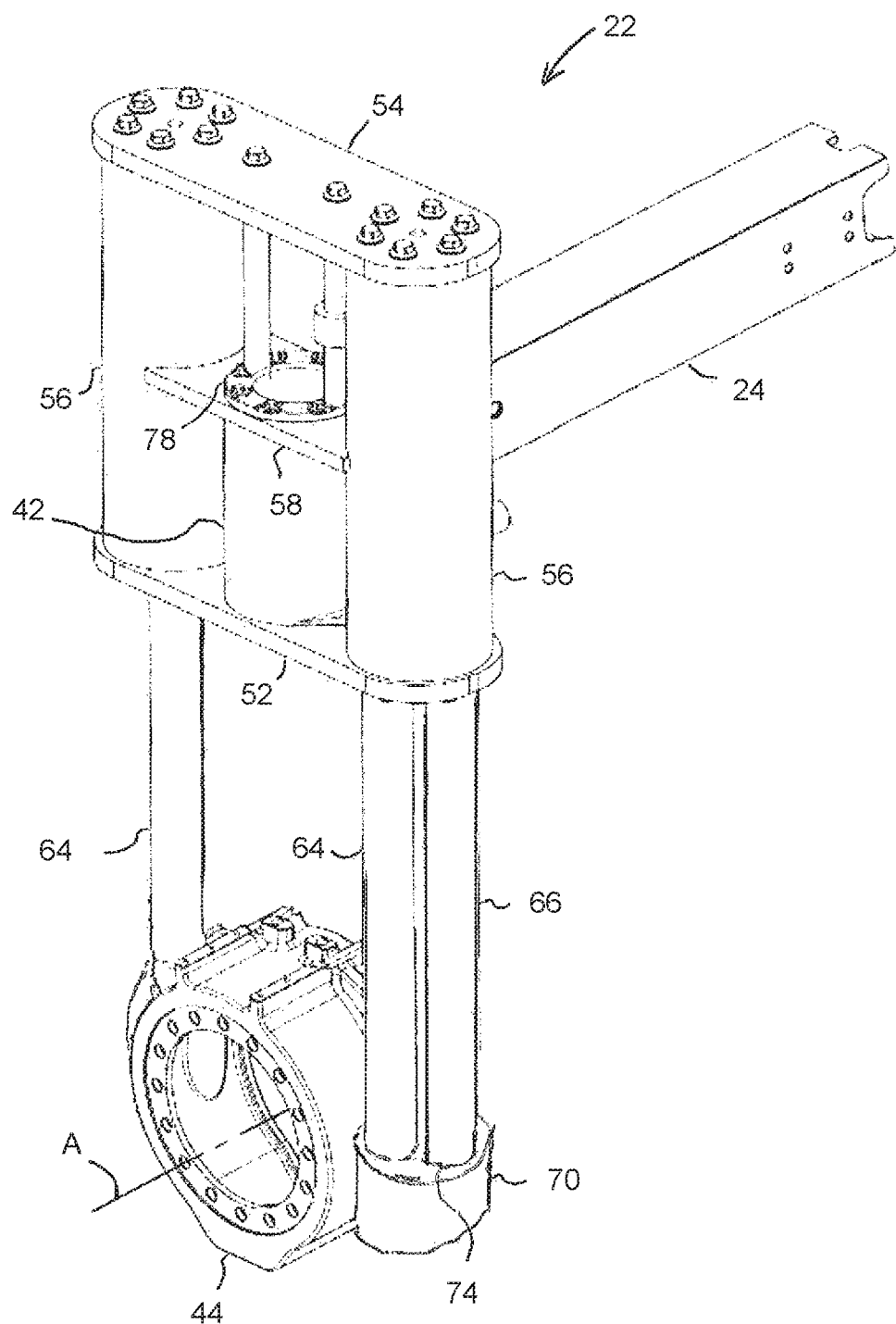
FIG. 3 illustrates another view of the suspension module of FIG. 2 in the first operating position.
Figure 4:
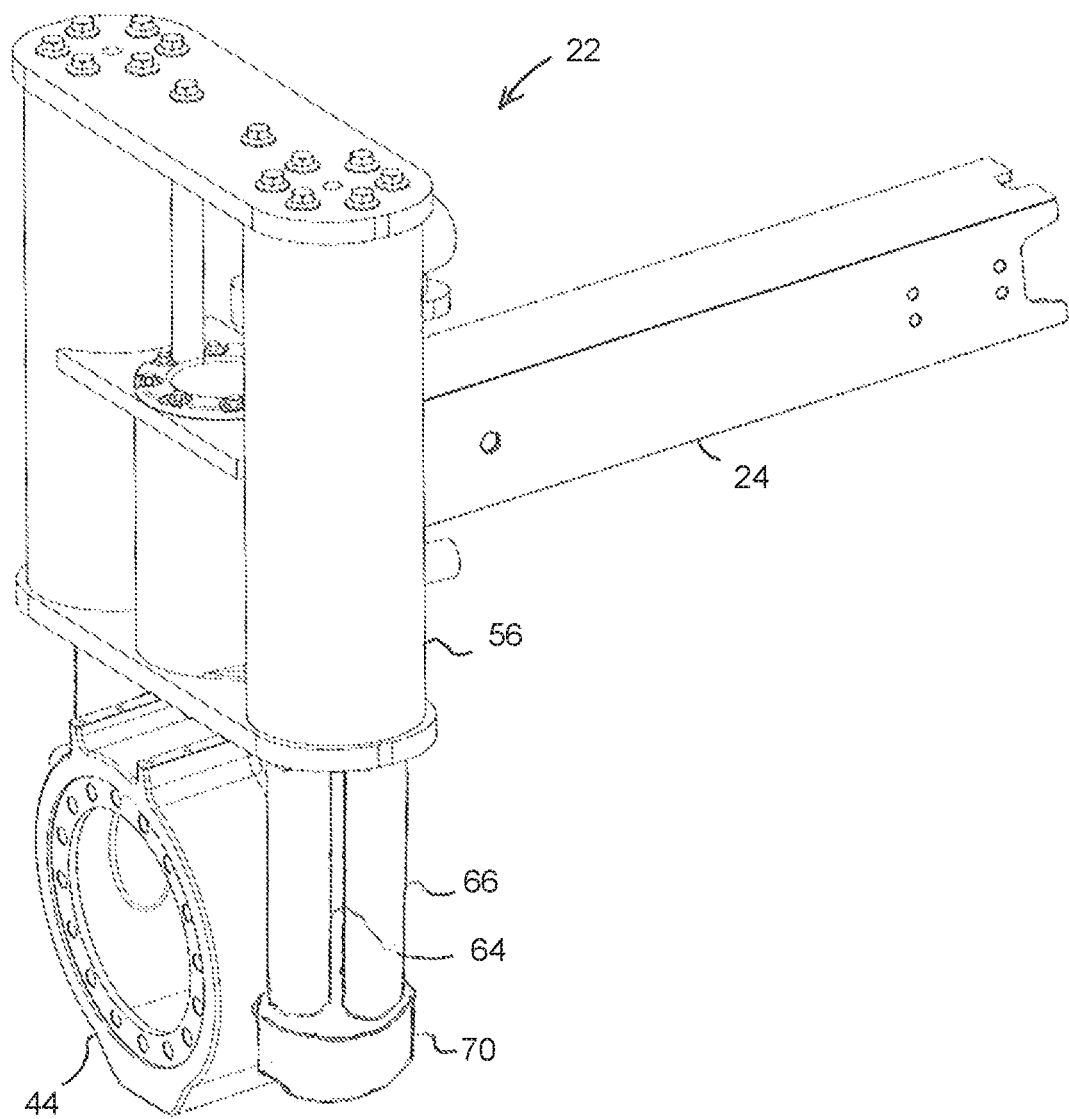
FIG. 4 illustrates the suspension module of FIG. 2 in a second operating position.

Turning now to FIGS. 2-4, one of the suspension modules 22 is illustrated in greater detail. As each suspension module 22 is desirably substantially similar to the other suspension modules, only one need to be described herein. FIGS. 2 and 3 show the module 22 in an elevated position used to increase off-road vehicle clearance for the vehicle 10, while FIG. 4 shows suspension module 22 in a lowered position. The suspension module 22 broadly includes a spindle 40 pivotably connected with a pivot element 42 on the axle 24 defining a substantially vertical pivot axis. The spindle 40 is also connected to a wheelbox 44 forming a portion of the hub 38 of each wheel 14.

In the illustrated embodiment, the spindle 40 has a lower attachment member 52 and an upper attachment cap 54 separated by a space. Outer ends of the lower attachment member 52 and upper cap 54 are rigidly interconnected by a pair of lift cylinders 56. A mid plate 58 extends between the lift cylinders 56 intermediate the lower attachment member and upper cap 52, 54 with the pivot element 42 received between the lower attachment member 52 and mid plate 58. Desirably, the lower attachment member 52, mid plate 58, upper cap 54 and lift cylinders 56 forming the spindle 40 are welded or otherwise joined together using sound engineering judgment.

Figure 5:
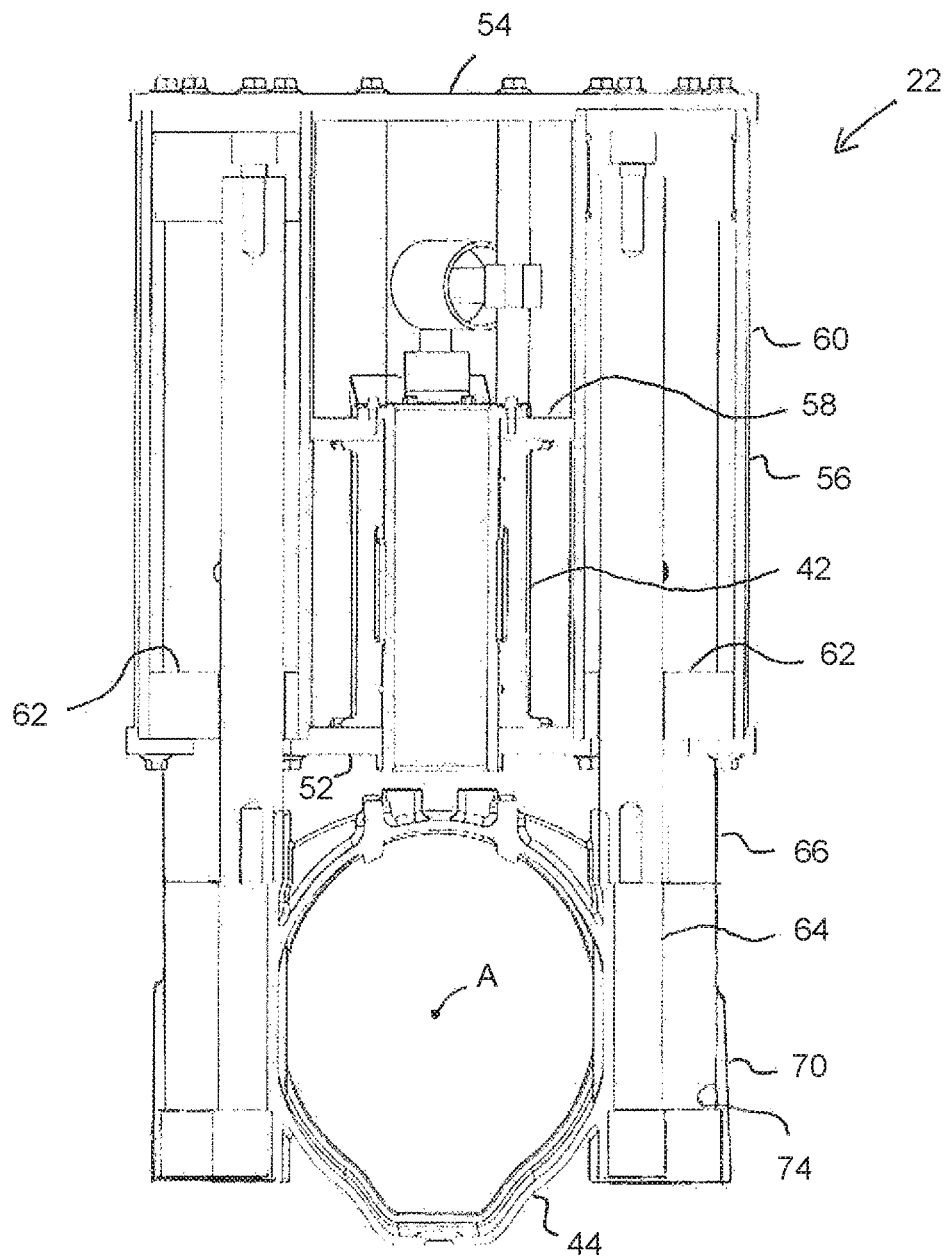
FIG. 5 is a cross-sectional view of the suspension module in the operating position of FIG. 4.
Figure 6:
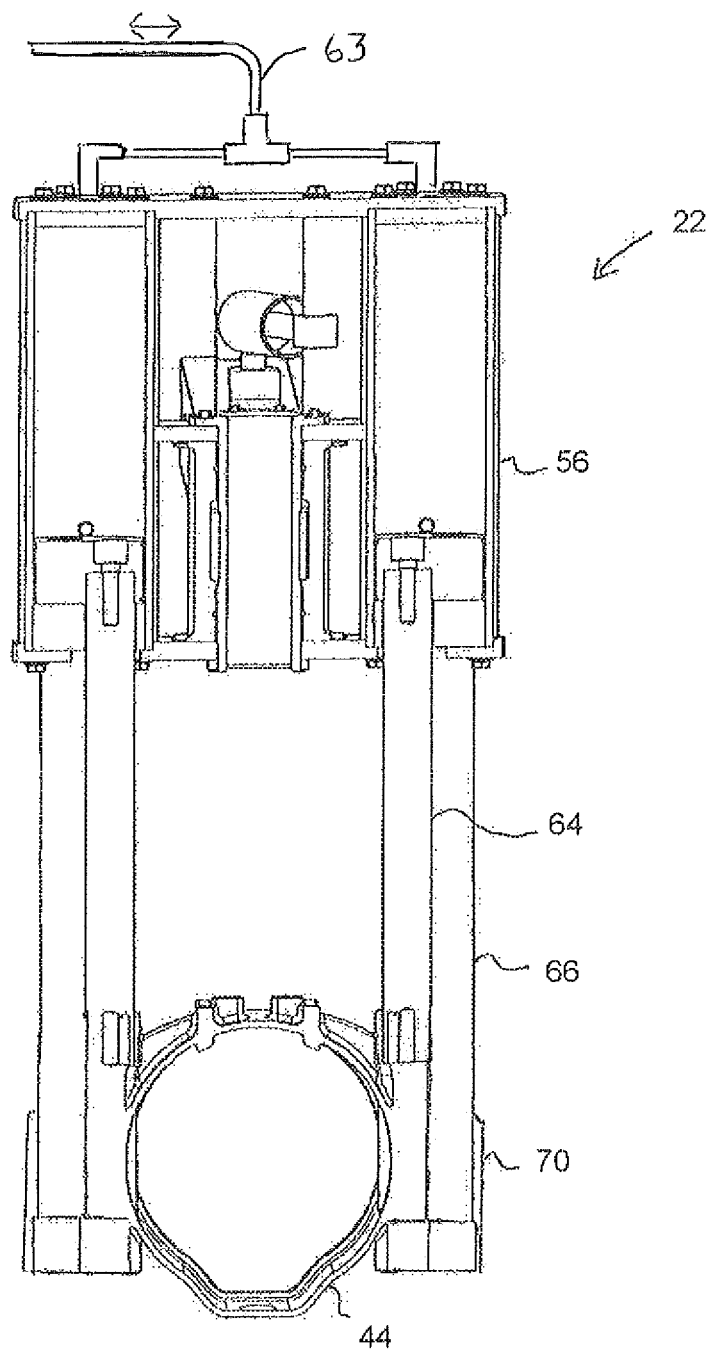
FIG. 6 is a cross-sectional view of the suspension module in the operating position of FIG. 2.

As best seen in FIGS. 5 and 6, in the illustrated embodiment the lift cylinder 56 may be of any known design with a housing 60 that is desirably substantially cylindrical in shape. An internal ram 62 is slidingly engaged in the housing 60. A common pneumatic circuit 63 may allow the ram 62 to extend or retract within the housing 60 of the lift cylinder 56 as would be understood by one skilled in the art. This action by the lift cylinder 56 may supply the power to move the vehicle 10 up or down between the high-clearance and low-clearance positions.

The ram 62 of each lift cylinder 56 is connected to the wheelbox 44 with first and second strut rods 64, 66. The first and second strut rods 64, 66 are parallel or substantially parallel. The strut rods 64, 66 are configured to extend from the lift cylinder 56 to allow the spindle 40 to move relative to the wheelbox 44 while also transferring pivot torque between the wheelbox 44 and the spindle 40. The length of each of the strut rods 64, 66 may be between about twelve inches and about thirty-six inches and, more specifically, between about twenty inches and about thirty inches. The strut rods 64, 66 may be positioned symmetrically about a center of the wheelbox 44 and a center of the spindle 40.

In the illustrated embodiment, the wheelbox 44 has a casing 70 on outer sides thereof having a pair of wheelhub sleeves 74. Each sleeve 74 receives one of the strut rods 64, 66. Desirably, the second strut rod 66 is positioned in an offset or angled position relative the first strut rod 64 such that they do not align in either a parallel or transverse arrangement with an axis A of the wheelbox 44. In the illustrated embodiment, the first strut rod 64 is positioned in closer to the axis A of the wheelbox 44 and further out from the chassis 12 of the vehicle 10 such that it is closer to an outer face of the wheelbox 44. Desirably, the strut rods 64, 66 are positioned such that a line connecting the center of the strut rods 64, 66 forms an angle between 30-60 degrees with the axis A. In one embodiment, the casing 70 with the wheelhub sleeves 74 and the wheelbox 44 are formed as an integral cast component with the strut rods 64, 66 welded therein, but the strut rods 64, 66 may press fit, bolted, or otherwise joined to the wheelbox 44 using sound engineering judgment.

The spindle 40 may be moveable between a first, standard clearance operating position (FIG. 4), a second, high clearance operating position (FIGS. 2 and 3), and any position in-between relative to the wheelbox 44 to thereby control the clearance height of the vehicle 10 relative the ground surface. The difference in the position of the axle 24 relative the wheelbox 44 between the first standard clearance operating position and the second high clearance operating position may be within the range of about five inches to about fifty inches. More specifically, the difference may particularly be about ten inches, about twenty inches, about thirty inches or about forty inches. As used herein, an "operating position" is a selectable position of the wheelbox 44 relative to the spindle 40. In operation, the suspension modules 22 may be used to raise and lower the chassis 12 of the application vehicle 10. More specifically, an operator may remotely control operation of the suspension modules 22 to raise and lower the chassis 12 using, for example, a user interface elements in the cab 18. Thus, the operator may raise and lower the chassis 12 while seated in the cab 18.

A bushing 78 extends between the lower attachment members 52 and mid plate 58 of the spindle 52 within the pivot element 42 to facilitate rotation of the spindle 40 relative to the pivot element 42. Thus, the spindle 40 and the wheelbox 44 are configured to pivot in unison, but the spindle 40 is slidingly coupled to the wheelbox 44 with the lift cylinders 56 such that the spindle 40 is able to move between a plurality of operating positions relative to the wheelbox 44 to allow the vehicle 10 connected to axle 24 to be raised or lowered. A pivot actuator 80 is pivotably coupled with the axle 24 and with a member 82 on the spindle 40 to pivot the suspension module 22 relative to the axle 24 and thereby steer the wheel 14 attached to the wheelbox 44. In the illustrated embodiment, the pivot actuator 80 is a hydraulic cylinder. Alternately, the pivot actuator 80 may include a rotatory hydraulic actuator connected to the axle 24 and to the spindle 40. The pivot actuator 80 selectively drives pivoting movement of the suspension module 22 relative to the chassis 12 and may be controlled by a vehicle operator or an automated guidance system to steer the application vehicle 10. The suspension module 22 is configured to pivot relative to the axle 24 to thereby pivot a wheel 14 coupled with the wheelbox 44 and steer the application vehicle 10. The suspension module 22 may pivot between a first extreme position and a second extreme position about an axis of passing through, and defined by, the axle 24. The suspension module 22 pivots as a single unit such that, regardless of the position of the wheelbox 44 relative to the spindle 40, the wheelbox 44 and spindle 40 pivot in unison.

A pneumatic lock within the pneumatic circuit 63 may prevent the ram 62 from extending or retracting once it is in a desired state. This pneumatic lock may be in addition to a mechanical lock provided by a locking cylinder. In one embodiment, at least one of the lift cylinders 56 may have a locking mechanism 90 to prevent the suspension module 22 from changing height once it reaches its desired position. In one embodiment, the locking mechanism 90 is disposed on a side of the lift cylinder 56 and has a pneumatically actuated rod 92. When the locking cylinder rod 92 is extended, rod 92 may engage a hole (not seen) in the ram 62 to prevent ram 62 from moving axially up or down. The locking cylinder 90 may lock the ram 62 in place once rod 92 reaches its extended position. Desirably, the locking mechanism 90 can drive the rod 92 pneumatically or by hydraulics using sound engineering judgment. Moreover, locking cylinder 90 may be spring loaded so that it may extend in a no power state and may retract when power is applied. This may ensure that the locking mechanism 90 will engage and stay engaged to lock the ram 62 if power is lost or if the vehicle is turned off.

Desirably, the lift cylinders 56 use compressed air or other fluid to regulate motion transfer between the pivot element 42 and the wheelbox 44. However, one skilled in the art will understand that the lift cylinders may contain air, nitrogen, hydraulic oil or other fluid.

The suspension module 22 may be the primary component of the application vehicle 10 configured to regulate motion transfer between the wheels 14 (or other ground engaging element) and the chassis 12. The axles 24, for example, may be rigidly connected to portions of the chassis 12. Furthermore, the suspension assembly 48 operates to regulate motion transfer between the wheels 14 and the chassis 12 regardless of the operating position of the suspension modules 22. Thus, the suspension module 22 performs essentially the same function regardless of whether the chassis 12 is in a lowered position (e.g., FIG. 4), a raised position (e.g., FIGS. 2, 3) or somewhere in between. When the lift cylinders 56 are allowed to float, they provide a suspension that softens the ride and absorbs shocks.

Although the invention has been described with reference to the exemplary embodiments illustrated in the attached drawing figures, it is noted that equivalents may be employed and substitutions made herein without departing from the scope of the invention as recited in the claims.

The invention claimed is:

1. A suspension module for supporting a vehicle chassis on a wheel of the vehicle, the suspension module comprising:
   a spindle pivotably connected to an axle on the vehicle chassis with a pivot element on the axle defining a substantially vertical pivot axis, the spindle comprising a lower attachment member and an upper attachment cap separated by a space, wherein outer ends of the lower attachment member and outer ends of upper cap are rigidly interconnected by a pair of lift cylinders, the spindle further comprising a mid plate extending between the lift cylinders intermediate the lower attachment member and upper cap with the pivot element received between the lower attachment member and mid plate, and wherein each of the pair of lift cylinders comprises a ram movable within a housing of the lift cylinder;
   a wheelbox mounted to the wheel and slidingly coupled with the spindle, wherein the spindle is configured to move between a standard operating position and a high clearance operating position relative to the wheelbox;
   first and second strut rods connecting the wheelbox with the ram of a first one of the pair of lift cylinders, and third and fourth strut rods connecting the wheelbox with the ram of a second one of the pair of lift cylinders, wherein the strut rods are configured to extend from the respective lift cylinder to allow the spindle to move relative to the wheelbox while also transferring pivot torque between the wheelbox and the spindle; and
   a pneumatic circuit configured to move each of the rams within the respective housing of each of the lift cylinders to move the vehicle up or down between the high-clearance and low-clearance positions.

2. The suspension module of claim 1 wherein a length of each of the strut rods is between 12 inches and 36 inches.

3. The suspension module of claim 1 wherein the strut rods are positioned symmetrically about a center of the wheelbox and a center of the spindle.

4. The suspension module of claim 1 wherein the wheelbox has a casing on outer sides thereof having a pair of wheelhub sleeves, each sleeve configured to receive one of the strut rods.

5. The suspension module of claim 1 wherein the second strut rod is positioned in an offset position relative the first strut rod such that they do not align in either a parallel or transverse arrangement with an axis A of the wheelbox.

6. The suspension module of claim 5 wherein the first strut rod is positioned closer to the axis A of the wheelbox and further from the chassis of the vehicle such that the first strut rod is closer to an outer face of the wheelbox.

7. The suspension module of claim 5 wherein the first and second strut rods are positioned such that a line connecting a center point of each of the first and second strut rods forms an angle between 30 and 60 degrees with the axis A.

* * * * *